US012708974B2

(12) United States Patent
Eceiza Agote et al.

(10) Patent No.: US 12,708,974 B2
(45) Date of Patent: Aug. 18, 2026

(54) MACHINE TOOL

(71) Applicant: ETXE-TAR, S.A., Elgoibar (ES)

(72) Inventors: Patxi Eceiza Agote, Elgoibar (ES); Alex Martín, Elgoibar (ES); Amaiur Atutxa Ocerin, Elgoibar (ES)

(73) Assignee: ETXE-TAR, S.A., Elgoibar (ES)

( * ) Notice: Subject to any disclaimer, the term of this patent is extended or adjusted under 35 U.S.C. 154(b) by 555 days.

(21) Appl. No.: 18/022,881

(22) PCT Filed: Jun. 25, 2021

(86) PCT No.: PCT/EP2021/067529
§ 371 (c)(1),
(2) Date: Feb. 23, 2023

(87) PCT Pub. No.: WO2022/042901
PCT Pub. Date: Mar. 3, 2022

(65) Prior Publication Data
US 2023/0321780 A1 Oct. 12, 2023

(30) Foreign Application Priority Data
Aug. 28, 2020 (EP) .................................... 20382769

(51) Int. Cl.
*B23Q 39/02* (2006.01)
*B23B 3/06* (2006.01)
(Continued)

(52) U.S. Cl.
CPC ........... *B23Q 39/023* (2013.01); *B23B 3/065* (2013.01); *B23B 3/32* (2013.01); *B23B 5/18* (2013.01);
(Continued)

(58) Field of Classification Search
CPC ............ Y10T 29/5133; Y10T 29/5129; Y10T 29/5128; Y10T 29/5127; Y10T 82/2524;
(Continued)

(56) References Cited

U.S. PATENT DOCUMENTS 2,138,522 A * 11/1938 Groene .................... B23B 5/18 74/822
2,291,035 A * 7/1942 Groene .................... B23B 5/18 82/129
(Continued)

FOREIGN PATENT DOCUMENTS

CN 201625896 U 11/2010
CN 106141213 A 11/2016
(Continued)

OTHER PUBLICATIONS

International Search Report for International Application No. PCT/EP2021/067529, mailed Sep. 29, 2021, 6 pages.
(Continued)

*Primary Examiner* — Erica E Cadugan
(74) *Attorney, Agent, or Firm* — CANTOR COLBURN LLP

(57) ABSTRACT

A machine tool for the machining of elongate workpieces includes a workpiece support column having workpiece support components for supporting a first workpiece and second workpiece support components for supporting a second workpiece. The first workpiece support component and the second workpiece support component are arranged for supporting the first workpiece vertically above the second workpiece. The workpiece support column is rotatable around a vertical axis so as to shift the workpieces between the machining station and a station for loading and unloading of workpieces. The workpiece support component include a drive element for applying torque to the workpieces for machining of the workpieces by turning. A motor
(Continued)

and chuck assembly and a method of machining workpieces are related.

11 Claims, 9 Drawing Sheets

(51) Int. Cl.

| | |
|---|---|
| ***B23B 3/32*** | (2006.01) |
| ***B23B 5/18*** | (2006.01) |
| ***B23B 9/00*** | (2006.01) |
| ***B23B 9/08*** | (2006.01) |
| ***B23B 9/12*** | (2006.01) |
| ***B23B 11/00*** | (2006.01) |
| ***B23B 13/04*** | (2006.01) |
| ***B23C 3/06*** | (2006.01) |
| ***B23P 23/02*** | (2006.01) |
| ***B23Q 1/70*** | (2006.01) |
| ***B23Q 3/06*** | (2006.01) |
| ***B23Q 5/10*** | (2006.01) |
| ***B23Q 39/04*** | (2006.01) |
| *B23Q 39/00* | (2006.01) |

(52) U.S. Cl.
CPC ................ *B23B 9/005* (2013.01); *B23B 9/08* (2013.01); *B23B 13/04* (2013.01); *B23P 23/02* (2013.01); *B23Q 1/70* (2013.01); *B23Q 3/061* (2013.01); *B23Q 5/10* (2013.01); *B23Q 39/04* (2013.01); *B23Q 39/046* (2013.01); *B23B 2215/20* (2013.01); *B23C 3/06* (2013.01); *B23C 2220/64* (2013.01); *B23Q 2039/002* (2013.01); *B23Q 2039/008* (2013.01); *Y10T 29/5114* (2015.01); *Y10T 29/5129* (2015.01); *Y10T 29/5133* (2015.01); *Y10T 82/2524* (2015.01); *Y10T 82/2562* (2015.01); *Y10T 409/30756* (2015.01)

(58) Field of Classification Search
CPC ............. Y10T 82/19; Y10T 409/30756; Y10T 29/5109–5114; Y10T 483/1705; Y10T 409/305656–305824; B23Q 39/046; B23Q 39/042; B23Q 39/04; B23Q 2039/008; B23B 3/30; B23B 13/04; B23B 5/18; B23B 2215/20; B23B 3/065; B23B 3/162; B23B 3/165; B23B 3/168; B23B 11/00; B23C 3/06; B23C 3/08; B23C 2215/16; B23C 2215/20; B23C 1/14
USPC ........ 29/38 E, 38 B, 38 A, 38 R, 27 R–27 C; 82/129, 106; 409/199, 165–168; 483/18
See application file for complete search history.

(56) References Cited

U.S. PATENT DOCUMENTS

| | | | | | |
|---|---|---|---|---|---|
| 5,452,502 | A * | 9/1995 | Walter | B23Q 1/5437 | 29/38 A |
| 5,699,598 | A | 12/1997 | Hessbruggen et al. | | |
| 5,997,452 | A * | 12/1999 | Assie | B23B 5/18 | 409/200 |
| 6,203,478 | B1 | 3/2001 | Gorrochategui | | |
| 6,287,245 | B1 * | 9/2001 | Randecker | B23Q 1/60 | 408/46 |
| 6,684,500 | B1 | 2/2004 | Kohlhase et al. | | |
| 2001/0008862 | A1 * | 7/2001 | Gorrochategui | B23Q 39/04 | 408/1 R |
| 2014/0345429 | A1 * | 11/2014 | Cano | B23B 31/103 | 82/1.11 |
| 2015/0078852 | A1 * | 3/2015 | Ibarra Garces | B23Q 39/026 | 409/131 |

FOREIGN PATENT DOCUMENTS

| | | | |
|---|---|---|---|
| DE | 29907963 | U1 | 7/1999 |
| DE | 20303147 | U1 | 4/2003 |
| DE | 10343003 | A1 | 4/2005 |
| DE | 20221274 | U1 * | 9/2005 |
| DE | 102016004178 | A1 | 10/2017 |
| EP | 0334298 | A2 | 9/1989 |
| EP | 2722119 | A1 | 4/2014 |
| EP | 2805794 | A1 | 11/2014 |
| EP | 3112085 | A1 | 1/2017 |
| EP | 3117954 | A1 | 1/2017 |
| WO | 0207920 | A1 | 1/2002 |
| WO | 2005087414 | A1 | 9/2005 |
| WO | 2017194041 | A2 | 11/2017 |
| WO | 2017211336 | A1 | 12/2017 |
| WO | 2017220290 | A1 | 12/2017 |
| WO | 2019151708 | A1 | 8/2019 |

OTHER PUBLICATIONS

Chinese Office Action for Application No. 202180063317.8, dated Dec. 22, 2025, 27 pages with translation.

* cited by examiner

B1
B53
B2
14
B53
24
W2
W1
11
1001
1002
21

MACHINE TOOL

CROSS-REFERENCE TO RELATED APPLICATIONS

This application is a 35 U.S.C. § 371 National Stage patent application of PCT/EP2021/067529 filed on 25 Jun. 2021, which claims the benefit of European patent application no. 20382769.6 filed on 28 Aug. 2020, the disclosures of which are incorporated herein by reference in their entirety.

TECHNICAL FIELD

The present disclosure relates to the field of machine tools and, more particularly, to the field of machine tools for carrying out different kinds of machining operations on workpieces, in particular on metal workpieces.

BACKGROUND

Machining of workpieces implies removing material using cutting tools. There are many different kinds of machining operations, but they can generally be classified into three groups of processes, namely, turning, drilling and milling. Typically, a specific machine tool is required for taking care of each machining operation.

For example, drilling is a process for creating a hole in a workpiece: the drill enters the workpiece and cuts a hole with a diameter equal to the one of the tool. Boring and reaming are other machining operations that can be considered to pertain to the same group as drilling, but which are carried out on a hole that has typically been previously established by drilling.

Milling is a process that is typically used to remove material from a metal workpiece that is not axially symmetric. Removal of material is carried out using a tool, also referred to as a cutter, that is rotated at high speed.

Differently from drilling and milling where rotary tools are applied to a stationary workpiece, in turning operations it is the workpieces that is rotated at high speed, using a lathe in which a workpiece is clamped—typically, between a headstock and a tailstock—and rotated at high speed, whereby a cutting tool contacts the workpiece to remove the material. The torque that produces the rotational movement of the workpiece is applied to the workpiece via a chuck that forms part of the headstock and that clamps the workpiece at one of its ends.

Typically, for the mass production of objects, such as metal objects, such as metal components for vehicles or other applications, different operations are carried out on the workpieces in different machining stations. Typically, for high productivity and reliability, special purpose machines are used. The workpieces may be processed in different machining stations, whereby a workpiece may be subjected to a sequence of different machining operations. Operations such as turning, milling, drilling, reaming, etc. can be carried out in different machines forming a production line. Production lines are typically designed for high productivity and reliability. If demand exceeds the capacity of existing production lines, one or more additional lines may be added.

It is known in the art to design machines capable of carrying out a plurality of different machining operations. For example, a lathe for processing workpieces by turning can additionally incorporate sub-systems for, for example, milling. An example of this kind of system is disclosed in U.S. Pat. No. 6,684,500-B1 which describes an example of the typical robust machine bed incorporating spindle stocks with chucks for gripping and high-speed rotation of a workpiece, and displaceable tool supports carrying different kinds of tools for carrying out different types of machining operations on the workpiece. Due to the particularities of high-speed rotation of workpieces for turning operations, including the need to transfer torque to the workpiece and to ensure compensation of unbalances, machine tools intended to allow for machining by turning and additionally by other types of machining are typically based on a lathe machine layout, additionally incorporating the spindles needed for other machining operations. Another example of a machine tool that allows for different types of machining operations (namely, both machining operations based on rotation of the workpiece and machining operations based on rotation of the tool) is disclosed in DE-10343003-A1. On the other hand, WO-2017/220290-A1 discloses, inter alia, how a machine tool can be adapted so as to carry out different kinds of operations, such as milling and turning, and how this may involve adaptation of the drive means in charge of the rotation of the workpiece.

Due to the need for stability and torque transfer, lathes for turning of metal workpieces typically have a substantial size in the axial direction, that is, in the direction of the axis of rotation. This is often due to the need for radial stability and the need to accommodate the clamping mechanism, typically involving a hydraulic cylinder or other means for actuating the clamping jaws of the chuck to firmly hold the end of the workpiece. WO-02/07920-A1 discloses a drive and chuck design that aims at reducing the axial extension, but still embodied in a machine with a typical lathe layout.

Loading and unloading of workpieces can be a time-consuming task, and may hamper productivity. WO-05/087414-A1 discloses a system for bringing workpieces to the machining area in a so-called vertical turning machine, including two turning spindles for parallel turning of two workpieces. The machine comprises a carriage channel, which extends from the rear side of the machine to the front side of the machine and which accommodates a loading carriage for the combined feeding and removal of the workpiece along two paths and which leads to the workpiece machining space. WO-2017/211336-A1 discloses another example of a vertical turning machine for parallel turning of two workpieces, loaded and unloaded using a multi-axle robot. WO-2017/194041-A2 discloses a machine tool with two workpiece spindles which are displaceable along guide rails, in relation to the machine frame. A further example of a machine with two vertical workpiece spindles for simultaneous machining of two workpieces is disclosed in U.S. Pat. No. 5,699,598-A.

In the context of so-called vertical turning machines, DE-102016004178-A1 discloses a machine involving a rotatable workpiece-spindle carrier, with two workpiece-spindles that are shifted between a loading station and a machining station by turning the workpiece-spindle carrier.

EP-2722119-B1, EP-2805794-A1 and U.S. Pat. No. 6,203,478-B1 disclose machine tools for carrying out operations such as milling and drilling on crankshafts, comprising a workpiece support column that is capable of rotating around a vertical axis, for example, to provide access to the workpieces from different angles, that is, to establish different angles of attack between workpiece and tool. The capability of rotating can also be useful to displace the workpieces between a station for loading and unloading, and a station where the machining operations are carried out by interaction between the workpiece and a rotary tool, such as a drill.

CN-106141213-A discloses an electrospindle for driving rotatable tools, such as drills or milling cutters. The tool is retained by applying a clamping force in the axial direction of the spindle.

SUMMARY

A first aspect of the disclosure relates to a machine tool for the machining of elongate workpieces, such as crankshafts, camshafts, rotor shafts—such as rotor shafts for electrical vehicle motors—and other shafts or devices. The machine tool comprises:

a workpiece support column having a first workpiece support side comprising first workpiece support means for supporting a first workpiece and second workpiece support means for supporting a second workpiece, the first workpiece support means and the second workpiece support means being arranged for supporting the first workpiece vertically above the second workpiece; and a machining station comprising at least a first tool spindle for machining the first workpiece, and a second tool for machining the second workpiece, that is, the tool spindles are arranged to carry and, when appropriate, rotate tools that interact with the respective workpieces for removing material, especially metal, from the workpieces. In some embodiments, the machine may include further tool spindles.

The workpiece support column is rotatable around a vertical axis so as to shift the workpieces between the machining station and a station for loading and unloading of workpieces.

The first workpiece support means comprise at least a first chuck for clamping a first end of the first workpiece, and a first additional support element (for example, a further chuck or a live or dead center) for supporting a second end of the first workpiece. The first chuck and the first additional support element face each other along a first horizontal axis so as to allow for rotation of the first workpiece around the first horizontal axis.

The second workpiece support means comprise at least a second chuck for clamping a first end of the second workpiece and a second additional support element (for example, a further chuck or a live or dead center) for supporting a second end of the second workpiece. The second chuck and the second additional support element face each other along a second horizontal axis so as to allow for rotation of the second workpiece around the second horizontal axis, The first workpiece support means comprise drive means for applying torque to the first workpiece via the first chuck to rotate the first workpiece around the first horizontal axis for machining of the first workpiece by turning, and the second workpiece support means comprise drive means for applying torque to the second workpiece via the second chuck to rotate the second workpiece around the second horizontal axis for machining of the second workpiece by turning.

The term "workpiece support column" should not be interpreted narrowly, for example, as requiring any specific dimensional relationship between width, height and depth of the column, but is merely intended to denote that the workpiece support column has a vertical extension that is sufficient to carry out the function of supporting workpieces one above the other, as explained above.

The term "workpiece support side" should likewise not be interpreted narrowly, and especially not as requiring a certain flatness, continuity, or other characteristic. A side can be any portion of the column radially spaced from the axis of rotation of the column.

The term "rotation" should be interpreted broadly, in the sense that the workpiece support column is capable of rotating or pivoting around the vertical axis, at least to a sufficient extent to displace the workpieces between different stations, as explained above. In some embodiments, the workpiece support column may be capable of rotating by 360 degrees, that is, of carrying out complete turns, whereas in other embodiments the capacity of rotation may be more restricted, for example, to rotation by 180 degrees or even less.

In the present document the term "chuck" should be interpreted to encompass any device suitable for clamping an end of a workpiece for rotation of the workpiece by transmission of torque to the workpiece, so as to allow for machining of the workpiece by turning. In many embodiments, the chuck is a three-jaw or four-jaw chuck, with retractable jaws.

The reference to drive means for applying torque to a workpiece to rotate the workpiece for machining of the workpiece by turning should be interpreted to imply that the drive means are configured or adapted for relatively high-speed rotation of the workpiece, such as for rotation of the workpiece by more than 100 rpm, such as by more than 200 rpm or more than 250 rpm, so that machining of the workpiece can be carried out by a substantially stationary tool, as typically done in turning operations. That is, drive means that are only adapted for rotating a workpiece with low torque and/or low velocity, such as for modifying the angular position of the workpiece by rotating it around its longitudinal axis, but that are not capable of rotating the workpiece with sufficient velocity and torque for turning of a metal workpiece by removing material using a stationary tool, are not drive means for applying torque to a workpiece to rotate the workpiece for machining of the workpiece by turning in the sense of the present document. In some embodiments, the machine is adapted for rotating workpieces with a speed of more than 600 rpm, which may be desirable for power-skiving operations. In some embodiments, both the drive means for applying torque to the workpieces and the drive means for rotation of the tools may be embodied by direct drive motors for enhanced precision and to enhance synchronization between the rotation of the tools and the rotation of the workpieces, which may be of special benefit for operations such as power-skiving.

The reference to a first and a second workpiece, chuck, drive means, tool spindles, etc., should not be interpreted to rule out the presence of further workpieces, chucks, drive means, tool spindles, etc. For example, in some embodiments, instead of two workpieces arranged one above the other, the first workpiece support side may be arranged for holding and rotating three or more workpieces, one above the other. The same is true for the tool spindles. However, according to the disclosure, the first workpiece support side is arranged for supporting at least two workpieces, one above the other.

The claimed arrangement, capable of simultaneous turning of a plurality of workpieces, that is, of two, three or more workpieces arranged one above the other, enhances productivity. The capability of rotation of the workpiece support column facilitates loading and unloading, and also allows for setting suitable angles of attack between tool and workpiece in the horizontal plane, that is, in the plane perpendicular to the axis of rotation of the workpiece support column. Thus, the rotation of the workpiece support column not only serves the purpose of displacing the workpieces between a station for loading and unloading and one or more stations for machining, but also allows indexing of the workpieces to provide for a suitable angle of attack between tools and workpieces, without any need for pivoting the tool spindles around any vertical axes. This provides for flexibility and allows different machining operations to be carried out while the workpieces remain clamped on the workpiece support column.

Thus, the disclosure represents an improvement in the field of machine tools for turning operations, that provides for enhanced productivity and flexibility. Multiple operations can be carried out using a small number of tool spindles, for example, one single tool spindle per workpiece, and multiple workpieces (two or more) can be machined simultaneously, including machining by turning and power skiving. For example, turning can take place using a first angle of attack between the respective tool spindle and the respective workpiece, and power skiving can be carried out at another angle of attack, for example, to produce gear teeth or involute splines or sprockets or angularly distributed profiles extending substantially in the axial direction of the workpiece, that is, in parallel with the axis around which the workpiece is rotated for machining.

Thus, a large number of machining operations, including machining operations based on different principles, such as machining operations involving a workpiece that rotates at a rotational speed higher than the rotational speed of the tool (such as machining operations involving a non-rotating tool, which is frequently the case with turning), and machining operations involving a tool that rotates at a higher speed than the workpiece (for example, milling or drilling operations carried out on a workpiece that is substantially stationary during operation), and machining operations that require different angles of attack between the axis of the tool spindle and the axis of the workpiece (for example, power-skiving and drilling operations may be carried out under angles of attack between the axis of the tool spindle and the axis of the workpiece that are different from the angle of attack used during preceding and/or subsequent turning or milling operations) can be carried out on the workpiece while it remains in an axially and radially fixed position, supported by the workpiece support means. This can be an important advantage when small tolerances are required, as a plurality of different kinds of machining operations can be carried out while the workpiece remains axially and radially fixed on the workpiece support column.

In some embodiments of the disclosure, the first additional support element is a third chuck for clamping the second end of the first workpiece, and the second additional support element is a fourth chuck for clamping the second end of the second workpiece. The first workpiece support means comprise drive means for applying torque to the first workpiece via the third chuck to rotate the first workpiece around the first horizontal axis for machining of the first workpiece by turning, and the second workpiece support means comprise drive means for applying torque to the second workpiece via the fourth chuck to rotate the second workpiece around the second horizontal axis for machining of the second workpiece by turning. Whereas lathes are typically designed to apply torque to the workpiece at one end of the workpiece, the other end being free (which is often the case with axially short workpieces) or merely supported by a dead or live center, it has been found that it can be preferred to provide the machine with the capacity of applying torque to both ends of the workpiece, for example, to one end of the workpiece during part of the process, and to another end of the workpiece during another part of the process. For operations like turning, when a substantial amount of torque has to be applied to keep the workpiece rotating at high speed (such as at 100 rpm, 200 rpm, 250 rpm or more) while material is being removed using a substantially stationary tool, the chuck has to firmly clamp the end of the workpiece. This prevents access to the corresponding end portion of the workpiece for machining thereof, as the jaws of the chuck cover part of the workpiece adjacent to the end. The presence of a drive chuck at each end of the workpiece, that is, the presence of two workpiece-spindles per workpiece, makes it possible to selectively drive the workpiece by applying torque to its first end while machining the region adjacent to the second end, and selectively drive the workpiece by applying torque to its second end, while machining the region adjacent to the first end. This contributes not only to enhanced productivity, but also to reduced manufacturing tolerances as the workpiece can be substantially completely machined along substantially the entire axial length thereof, including machining by turning requiring application of torque to the workpiece via chucks, while the workpiece remains axially and radially fixed by the workpiece support means, between the respective centers of the chucks. Thus, high-precision turning can be carried out, which can be useful to, for example, minimize the need for subsequent grinding operations. Also, the capacity of turning the workpiece along its entire axial length, including the end areas where the jaws of the chucks interact with the workpiece, further reduces the need to shift the workpieces between different stations, thereby further enhancing productivity and improved tolerances. Moving a workpiece between different machining stations creates positioning uncertainty of the workpiece related to the supporting means in each machining station, and the subsequent lack of repeatability and less precision in the machining. In some embodiments, the machine is arranged for selectively retracting workpiece clamping jaws of one of the first chuck and the third chuck, and of one of the second chuck and the fourth chuck, while applying torque to the respective workpiece via the other one of the first chuck and the third chuck, and via the other one of the second chuck and the fourth chuck, so as to allow for machining of the workpieces along their entire lengths, while the workpieces remain axially and radially fixed by the first and second workpiece support means. The reference to retraction of clamping jaws of a chuck is intended to denote that at least parts of the chuck that overlap the end region of the workpiece at the respective end thereof, for example, chuck jaws that apply pressure onto the workpiece in the radial direction in a region of the workpiece adjacent to an end thereof, are retracted to allow that region of the workpiece to be machined by, for example, turning. The retraction typically takes place in the axial direction, once jaws are radially released from the workpiece. What is relevant is that the clamping means of the chuck that serve to clamp the surface of the workpiece be retracted in the sense that they do no longer grip the workpiece, but allow the workpiece to be accessed by a tool also in the region where access was previously prevented by the presence of the jaws or similar. In some embodiments, each of the first and third chucks comprises jaws arranged to apply pressure onto a surface of the workpiece in the radial direction to allow torque to be applied to the workpiece via the chuck, whereas the machine is arranged to selectively withdraw the jaws of the first chuck from the workpiece to allow for machining of the corresponding part of the workpiece while rotating the workpiece by applying torque to the workpiece via the third chuck, and withdraw the jaws of the third chuck from the workpiece to allow for machining of the corresponding part of the workpiece while rotating the workpiece by applying torque to the workpiece via the first chuck. Preferably, the same applies to the second and fourth chucks, mutatis mutandis. Thus, by selective retraction of the clamping jaws of one chuck and application of the torque via the other, a tool, such as a tool for turning, can access the workpiece for machining along the entire axial length of the workpiece, thereby facilitating complete machining, or substantially complete machining, while the workpiece remains axially and radially fixed. This can enhance productivity and reduce manufacturing tolerances.

In some embodiments of the disclosure, the workpiece support column has a second workpiece support side angularly spaced from the first workpiece support side, for example, placed opposite the first workpiece support side, for example, spaced 180 degrees from the first workpiece support side, that is, on the other/opposite side of the column. The second workpiece support side comprising third workpiece support means for supporting a third workpiece and fourth workpiece support means for supporting a fourth workpiece, the third workpiece support means and the fourth workpiece support means being arranged for supporting the third workpiece vertically above the fourth workpiece. Thus, in some embodiments, the workpiece support column can, by rotating for example 180 degrees, bring the workpieces supported by one of the workpiece support sides from the station for loading and unloading to the machining station for machining, and at the same time bring the other workpiece support side from the machining station to the station for loading and unloading, for unloading the machined workpieces. Thus, loading and unloading can take place on one side of the workpiece support column whereas machining is taking place on the other side of the workpiece support column. In other embodiments, there can be two machining stations, for example, placed on opposite sides of the workpiece support column, and one or more stations for loading and unloading may be placed, for example, between the machining stations, such that workpieces may be shifted from a machining station to a station for loading and unloading by rotating the workpiece support column by 90 degrees, etc. In many embodiments, the first workpiece support side and the second workpiece support side can be identical or similar, for example, comprising the same types of workpiece support means, for supporting the respective workpieces in the same way, for example, in order to allow the same kind of machining operations to be carried out in correspondence with the two workpiece support sides of the workpiece support column. In some embodiments, the third workpiece support means and the fourth workpiece support means are different from the first workpiece support means and the second workpiece support means, in order to allow machining operations to be carried out on workpieces supported on the second workpiece support side that cannot be carried out on workpieces supported on the first workpiece support side, in particular due to the manner in which the workpieces are supported on the first workpiece support side. For example, due to the necessity to allow for high speed rotation of the workpieces for turning, the first workpiece support means and the second workpiece support means may render access to certain parts of the workpieces, such as to the end faces thereof, impossible or unpractical. In some embodiments, the second workpiece support side may be substantially different from the first workpiece support side, for example, the third and fourth workpiece support means may differ from the first and second workpiece support means, to allow different machining operations to be carried out. For example, the third and fourth workpiece support means may be arranged to clamp the workpieces at positions that are axially spaced from the ends of the workpieces, thereby allowing machining operations to be carried out that cannot be carried out, or that cannot be carried out in the same way, when the workpieces are clamped by the first and second workpiece support means. Thus, after carrying out one or more machining operations on the workpieces supported on one of the workpiece support sides, those workpieces can be unloaded and later loaded onto the other workpiece support side (for example, after unloading workpieces supported on the other workpiece support side) whereafter further machining operations can be carried out. For example, the first workpiece support side may be optimized or adapted for machining the sides of the workpieces by turning, whereas the second workpiece support side may be adapted for machining of the ends of the workpieces, for example, for machining the centers of the workpieces.

In some embodiments, the workpiece support column, including the first workpiece support means and the second workpiece support means, is dimensioned to fit into a cylinder that is co-axial with the vertical axis (that is, with the axis of rotation of the workpiece support column) and that has a diameter of less than 2.5 m, preferably less than 2 m, more preferably less than 1.8 m, while allowing for turning of workpieces, such as shafts, having a length of 0.75 m. Thus, and contrary to most machines for turning of elongated objects, some embodiments of the present disclosure feature a very compact configuration in what regards the extension of the workpiece support column in the axial direction of the workpieces. This can be space saving and also contribute to the reduction of inertias in relation to the rotation of the column.

Another aspect of the disclosure relates to a motor and chuck assembly for a machine tool for the machining of workpieces by turning. The assembly comprises an electric motor, for example, a torque motor, for example, an axially short torque motor wherein the axial length of the rotor (which contains the permanent magnets of the motor) in some embodiments may be smaller than the external and/or inner diameter of the rotor. If a torque motor is used, a permanent magnet synchronous motor may often be preferred. The torque motor can directly drive a hollow workpiece-spindle, and no gearbox is needed to obtain the torque and rotational speed necessary for typical metal turning operations.

The motor of the assembly comprises a stator and a rotor placed radially inside the stator, the assembly further comprising a hollow workpiece-spindle extending through the rotor, the workpiece-spindle having a first end and a second end. The assembly further comprises a retractable jaw chuck at least partly (that is, partly or fully) arranged within the workpiece-spindle at the second end. That is, in operation, the end of the workpiece held by the chuck will be closer to the second end then to the first end of the workpiece-spindle. Actually, the end of the workpiece may be placed very close to the workpiece-spindle and thus axially close to bearing supporting the workpiece-spindle, which further contributes to radial stability. The retractable jaw chuck comprises jaws for clamping a workpiece. The workpiece-spindle is surrounded by the rotor at a position between the first end and the second end, and the workpiece-spindle is rotationally fixed to the rotor so that it rotates with the rotor.

The workpiece-spindle has a first inner diameter at the first end and a second inner diameter at the second end, and the rotor has a third inner diameter. The second inner diameter is substantially larger (such as at least 25%, 50%, 75% or 100% larger) than the first inner diameter (d1) and/or than the third inner diameter (d3). The larger diameter of the workpiece-spindle in correspondence with the second end provides for space for housing the retractable jaw chuck, or at least part thereof, within the workpiece-spindle itself, thereby allowing for a reduced axial extension of the motor and chuck assembly, which can be especially advantageous when the motor and chuck assembly is to be used in a turning machine where the workpiece-spindle extends in the horizontal direction while mounted on a support intended to rotate around a vertical axis, such as in the machine tool described above, or similar. A reduction of the axial extension in the horizontal plane saves space and also reduces inertia when rotating the support column. In many retractable jaw chucks (typically including retractable jaws actuated by a hydraulic cylinder or by other actuation means), the largest diameter corresponds to the jaw end of the chuck. Thus, a workpiece-spindle as described above makes efficient use of the space. Additionally, the varying internal diameter may also correspond to a similarly varying external diameter, which may be useful for providing sufficient radial and axial stiffness while keeping the axial and radial dimensions within limits, and also allows for a motor having relatively small dimensions in the radial direction, considering the radial extension of the chuck.

In some embodiments, the workpiece-spindle is rotationally supported by a first bearing placed at the first end of the workpiece-spindle or between the rotor and the first end, and a second bearing placed at the second end of the workpiece-spindle or between the rotor and the second end. The first bearing has a fourth inner diameter and the second bearing has a fifth inner diameter. The fifth inner diameter is at least 25% larger than the fourth inner diameter, preferably at least 50% larger, such as at least 75% larger, for example, at least 100% larger, than the fourth inner diameter. It has been found that using a large-diameter bearing for supporting the workpiece-spindle at the end adjacent to the workpiece allows for high stiffness, both radially and axially, while maintaining the axial dimensions limited and while allowing the workpiece-spindle to house the chuck, or at least part thereof, also the diametrically largest part of the chuck. Thus, one or more large diameter bearings can surround the chuck or part of it in the proximity of the second end of the workpiece-spindle, whereas one or more smaller diameter bearings can provide support on the opposite side of the rotor, such as at or close to the first end of the workpiece-spindle, where there may not be enough space for housing a large diameter bearing. It has been found that this kind of arrangement can help to substantially reduce the axial dimensions of the assembly, compared to many known assemblies featuring workpiece-spindles having substantially constant inner and/or outer diameters, while keeping the radial dimensions within limits.

In some embodiments, the workpiece-spindle is rotationally supported by a first bearing placed at the first end of the workpiece-spindle or between the rotor and the first end, and a second bearing placed at the second end of the workpiece-spindle or between the rotor and the second end, the first bearing having a fourth inner diameter and the second bearing having a fifth inner diameter. The workpiece-spindle has an axial length between the first end and the second end, wherein the axial length is less than three times the fifth inner diameter, such as less than two times the fifth inner diameter, such as less than 1.5 times the fifth inner diameter. Thus, rather than featuring the typical axially elongated configuration, the workpiece-spindle features an axially short configuration, in terms of the relation between the inner diameter of a bearing placed at the second end or between the rotor and the second end, and the axial length of the workpiece-spindle. This axially short configuration is especially beneficial when the motor and chuck assembly is to be used on a rotatable column as described above, whereas the use of at least one relatively large diameter bearing adjacent the end of the workpiece spindle that supports the workpiece is beneficial for radial and axial stability.

In some embodiments of the motor and chuck assembly, wherein the third inner diameter is smaller than the second inner diameter, such as less than 0.9, 0.8, 0.7 or 0.6 times the second inner diameter. This allows for the use of a relatively small diameter motor, while allowing the second end of the workpiece-spindle to be sufficiently large to accommodate the chuck or substantial parts thereof. The possibility to use, for example, standard (such as commercially available and/or non-expensive) torque motors can serve to reduce the costs of the assembly.

In some embodiments of the machine tool according to the first aspect of the disclosure described above, at least one of the workpiece support means comprises a motor and chuck assembly as described above. In some of these embodiments, the workpiece-spindle is rotationally supported by a first bearing placed at the first end of the workpiece-spindle or between the rotor and the first end, and a second bearing placed at the second end of the workpiece-spindle or between the rotor and the second end, the first bearing having a fourth inner diameter and the second bearing having a fifth inner diameter. The workpiece-spindle has an axial length between the first end and the second end, wherein the axial length is less than three times the fifth inner diameter, such as less than two times the fifth inner diameter, such as less than 1.5 times the fifth inner diameter. The machine tool is arranged for turning of workpieces having a maximum diameter S (that is, the “swing” of the machine tool/lathe), wherein the fifth inner diameter is larger than 0.5 S, for example, larger than 0.75 S, such as larger than 0.9 S. This has proven to be useful for providing radial and potentially also axial stability, in spite of a relatively short axial length of the workpiece-spindle and thereby of the entire motor and chuck assembly. In this technical field, the swing S is to be understood to be the largest diameter that the workpiece can have all along its axial extension while being capable of being turned by the machine, that is, without contacting any part of the machine when supported by the workpiece support means (chucks and centers). In typical lathe layouts, the swing is large in relation to the diameters of the bearings that support the workpiece-spindle, basically, due to the fact that for radial support, typical lathe layouts favour axially long and slim workpiece spindles. In some embodiments of the present disclosure, it is preferred to use axially short workpiece-spindles, to favor integration on a rotatable workpiece support column, whereas radial stability is provided by at least one relatively large inner diameter bearing adjacent to the workpiece, which further facilitates integration of the chuck into the workpiece-spindle.

A further aspect of the disclosure relates to a method of machining workpieces, comprising:

loading at least a first workpiece and a second workpiece onto a workpiece support column so that each of the first workpiece and the second workpiece is supported by the workpiece support column with a longitudinal axis of the respective workpiece extending horizontally, one of the workpieces being placed vertically above the other one of the workpieces;

rotating the workpiece support column around a vertical axis to bring the workpieces to a machining station;

carrying out at least a first machining operation comprising removing material from the workpieces by turning the workpieces, whereby turning the workpieces includes rotating the workpieces around the longitudinal axes of the respective workpieces (that is, by rotating the workpieces with a relatively high speed, such as with a speed of at least 100 rpm, 200 rpm, 250 rpm or more, while contacting each of the workpieces with at least one tool, such as with a substantially stationary tool; the term "first machining operation" is merely used to identify the machining operation, and does not imply that this machining operation is the first, or one of the first ones, in a sequence of machining operations; in some embodiments it is the only machining operation, and in other embodiments it is one of several machining operations, for example, the first one or the last one of several machining operations that are carried out while the workpieces remain supported on the workpiece support column);

unloading the workpieces from the workpiece support column.

In some embodiments, the method further comprises carrying out at least a second machining operation on the workpieces, different from the first machining operation, prior to unloading the workpieces from the workpiece support column. As explained above, the second machining operation may take place before the first machining operation, or after the first machining operation. In some embodiments, the first and second machining operations are both carried out by contacting the first workpiece with a tool using a first tool spindle, and by contacting the second workpiece with a tool using a second tool spindle. In some embodiments, the second machining operation comprises one of milling, drilling and power-skiving.

In some embodiments, the workpiece support column is rotated by an angle of more than 5 degrees and less than 85 degrees (such as by an angle of more than 15 degrees and less than 75 degrees, such as by an angle of more than 25 degrees and less than 65 degrees) between the first machining operation and the second machining operation, for example, in order to provide for a different angle of attack between the tool spindles and the workpieces, without any need for pivotation of the tool spindles in the horizontal plane.

In some embodiments, the first machining operation is carried out by rotating the first workpiece by applying torque to the first workpiece with a first chuck and by rotating the second workpiece by applying torque to the second workpiece with a second chuck during one part of the first machining operation, and by rotating the first workpiece by applying torque to the first workpiece with a third chuck and by rotating the second workpiece by applying torque to the second workpiece with a fourth chuck during another part of the first machining operation. By selectively using one of two chucks for rotating the workpiece, it is possible to machine also the axial end regions of the workpieces, for example, by releasing (retrieving, withdrawing) the clamping jaws of one of the chucks while torque is being applied by the other chuck, so as to facilitate access to the part of the workpiece where access would otherwise have been prevented by the clamping jaws. Thus, more complete machining of the workpiece can be achieved while the workpiece remains axially fixed between the two chucks. Thus, this method provides for enhanced flexibility and enhanced capacity of carrying out machining operations without removing the workpiece from, or rearranging the workpiece on, the workpiece support column. This further reduces the tolerances involved, while allowing machining of the workpiece along the entire length thereof to be carried out rapidly.

In some embodiments, at least one machining operation is carried out on the workpieces while the workpieces are supported on a first side of the workpiece support column, and at least another machining operation is carried out on the workpieces while the workpieces are supported on a second side of the workpiece support column. The workpieces may be clamped in different ways on the two sides of the workpiece support column, thereby allowing the machining tools to access different parts of the workpieces, and/or to access parts of the workpieces under different angles of attack.

In some embodiments, method is carried out using a machine tool as described above, and/or a motor and chuck assembly as described above.

In the machine tool and motor and chuck assembly described above, the drive means (such as the electric motor of the motor and chuck assembly) are preferably capable of applying a torque to the respective workpiece that is larger than 400 Nm, for example, larger than 500, 600, 700 or 800 Nm, that is, the drive means preferably have the capacity of applying this kind of large torque (although for many applications they may operate applying a lower torque, that is, they do not always have to operate at their maximum torque level).

The chucks of the machine tool and the chuck of the motor and chuck assembly are preferably retractable jaw chucks including a plurality of jaws, such as three or more jaws, configured such that the jaws are capable of movement in the radial direction, so as to apply radial clamping forces onto the workpiece, that is, onto an external or internal surface of the workpiece. This is a difference compared to many known arrangements used for supporting rotary or stationary tools, where the means for clamping or retaining the tool are arranged to interact with an internal space at a rear end of the tool, typically applying a clamping or retaining force in the axial direction. The chucks are preferably configured to apply relatively large clamping forces to the workpiece. For example, in some embodiments, the jaws may be capable of applying a clamping force of more than 75 kN, such as more than 100 kN, onto the workpiece (that is, onto an external or internal surface of the workpiece), in the radial direction. The clamping force may be generated by hydraulic means, which is a further difference compared to many tool spindles using spring-based clamping in the axial direction.

The capacity of radial movement of the clamping jaws further contributes to flexibility in that it facilitates the machining of workpieces having different diameters. Also, a floating arrangement of the jaws can be implemented to allow the center of the workpiece, that is, the axis around which the workpiece will rotate, to be correctly positioned even in cases in which there are differences in the radial distance between the center and the surface of the workpiece, for example, due to manufacturing tolerances.

BRIEF DESCRIPTION OF THE DRAWINGS

To complete the description and in order to provide for a better understanding of the disclosure, a set of drawings is provided. Said drawings form an integral part of the description and illustrate embodiments of the disclosure, which should not be interpreted as restricting the scope of the disclosure, but just as examples of how the disclosure can be carried out. The drawings comprise the following figures.

DETAILED DESCRIPTION OF THE DRAWINGS

Figure 1:
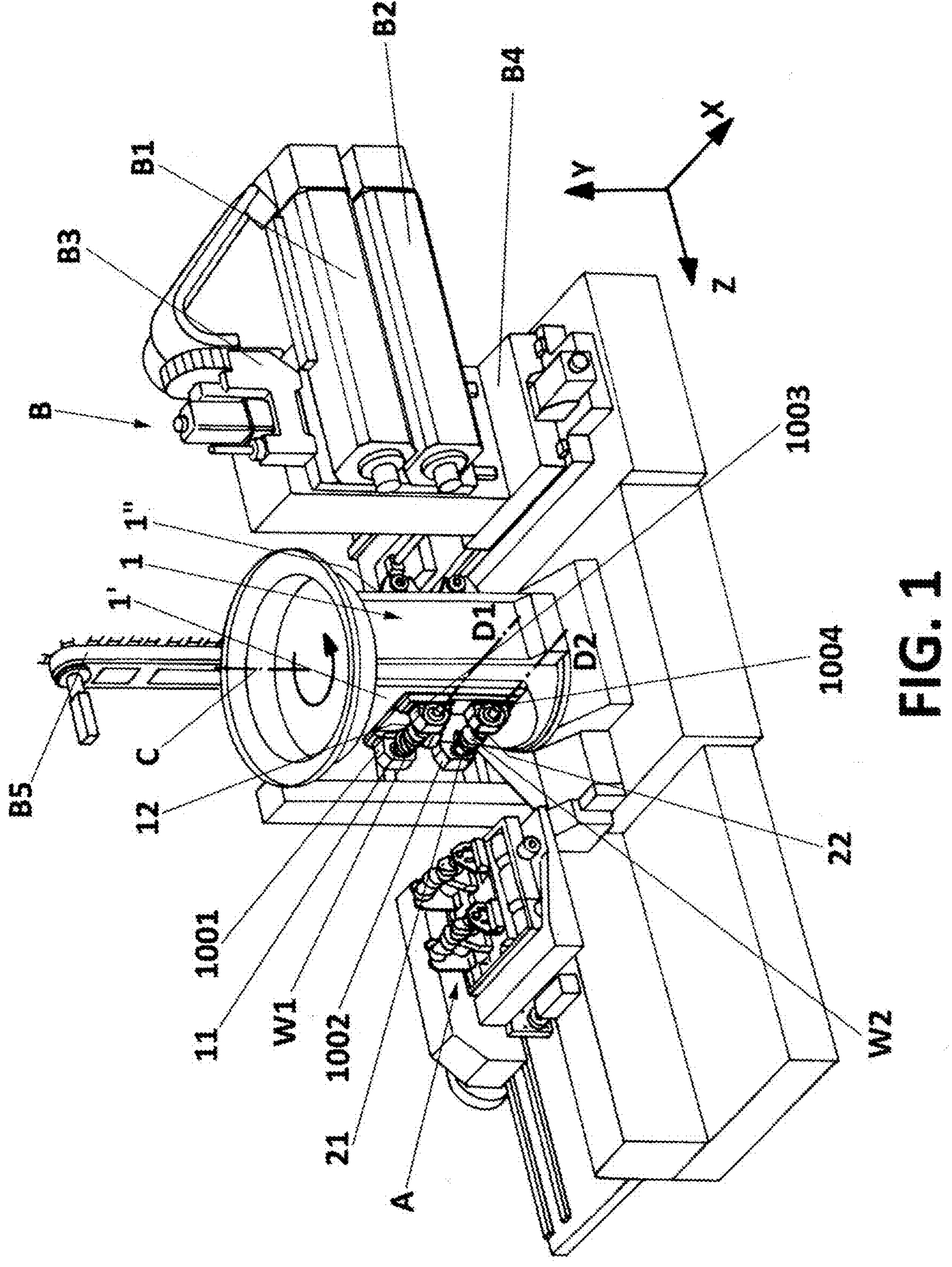
FIG. 1 is a schematic perspective view of a machine tool in accordance with an embodiment of the disclosure.

FIG. 1 schematically illustrates a machine tool for simultaneous machining of a plurality (namely, two) elongate workpieces W1, W2 mounted one above the other on a workpiece support column 1 positioned between a machining station B and a station A for loading workpieces onto the workpiece support column and for unloading workpieces from the workpiece support column. In the illustrated embodiment, the station A for loading and unloading includes a carriage specifically designed for efficient loading and unloading of workpieces. In other embodiments, the station A for loading and unloading of workpieces may include one or more industrial robots, or any other means appropriate for automatic or semi-automatic loading and unloading. In yet other embodiments, the station may be adapted for, or compatible with, manual loading and/or unloading of workpieces.

The machining station B comprises two tool spindles B1, B2, intended for the simultaneous machining of two workpieces, that is, a first tool spindle B1 for machining of one of the workpieces W1 and a second tool spindle B2 for machining of the second workpiece W2. In this embodiment, the two tool spindles are placed one above the other, on a carriage B3 that is moveable in the vertical direction (that is, in parallel with a vertical Y axis) on a column that is supported on a carriage B4 that is displaceable horizontally, in parallel with a horizontal X axis, which during some machining operations may be in parallel with the axes of the workpieces. The two tool spindles have independent drives for movement in parallel with a horizontal Z axis perpendicular to the X axis, basically, for displacing the tools towards the workpieces and away from the workpieces. The carriage B4 for horizontal movement can be displaced between a position where the tool spindles face the workpieces along the Z axis (or an axis parallel with the Z axis) so that the tools operated by the tool spindles may contact the workpieces, and a position where the tool spindles face a tool magazine B5 to carry out automatic tool replacement, for example, between the termination of one type of machining operation and the beginning of another type of machining operation, these machining operations requiring different tools.

In FIG. 1 the side 1' of the workpiece support column that faces the station A for loading and unloading workpieces supports two workpieces W1 and W2, schematically illustrated as crankshafts by way of example only. The two workpieces are supported one above the other, with their axes of rotation D1, D2 extending horizontally (in the illustrated position, in parallel with the X axis). In order to carry out machining of the workpieces, the workpiece support column 1 is rotated about a vertical axis of rotation C (sometimes referred to as the "B-axis" in the art), for example by an angle of between 100-260 degrees, such as by 180 degrees (whereby the rotational axes D1, D2 of the workpieces once again align with the horizontal X axis of the system), or by for example 150 or 210 degrees (whereby the rotational axes of the workpieces form an angle of 30 degrees with the X axis, in the horizontal plane), or by any other angle that allows the workpieces to be contacted by the tools carried by the tool spindles B1 and B2, for machining of the workpieces with a desired angle of attack between tool spindle (and tool) and workpiece. The tool spindles B1 and B2, provided with their respective tools, are actuated so as to contact the workpieces with the tools. In some machining operations, the tools can be kept substantially stationary whereas the workpieces are rotated so as to carry out machining by turning or similar. Other machining operations can be carried out by rotation of both tools and workpieces, for example, for producing grooves, involute splines or gear teeth, for example, by power-skiving. Other machining operations, such as drilling or milling, can be carried out by applying rotating tools to substantially stationary workpieces. The machine tool can be operated to carry out different kinds of machining operations while the workpieces remain clamped in their axial and radial positions on the workpiece support column. The workpiece support column may be rotated to provide for different angles of attack between tools and workpiece. For example, turning may sometimes be carried out with the tool spindles at 90 degrees with regard to the axis of rotation of the respective workpiece in the horizontal plane, whereas for example power skiving, drilling, or other operations may be carried out with a different angle between tool spindle and workpiece in the horizontal plane.

In FIG. 1 chucks (namely, a first chuck 11 and a second chuck 21, as well as a third chuck 12 and a fourth chuck 22) for clamping the workpieces are schematically indicated by their reference numbers on the first side 1' of the workpiece support column. The chucks form part of first workpiece support means 1001, 1003 and second workpiece support means 1002, 1004 (see for example FIG. 3) which additionally include means for driving the chucks and for actuating jaws of the chucks, as described below. The workpiece support column further comprises a second side 1" which may be substantially identical to the first side 1' in what regards the way in which the workpieces are clamped and supported. In other embodiments, the second side may be different from the first side.

Figure 2:
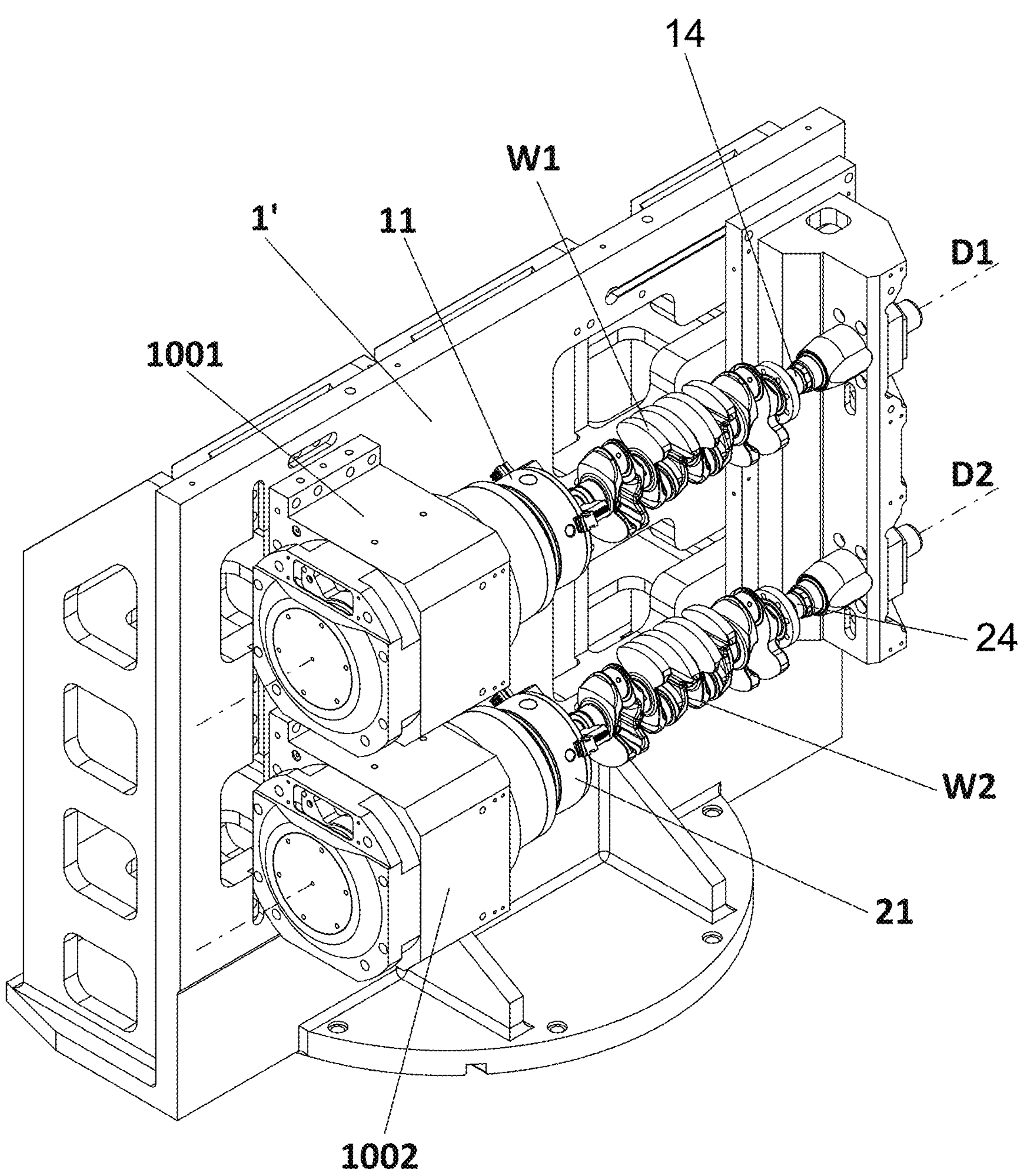
FIG. 2 is a schematic perspective view of a first workpiece support side of a workpiece support column in an embodiment of the disclosure.

FIG. 2 schematically illustrates the first side 1' of a workpiece support column 1 in an alternative embodiment where schematically illustrated chucks 11 and 21 as well as additional support elements in the form of (dead or live) centers 14, 24 support the workpieces by their axial ends. That is, in the embodiment illustrated in FIG. 2, chucks and drive means are only present at one end of each workpiece.

Figure 3:
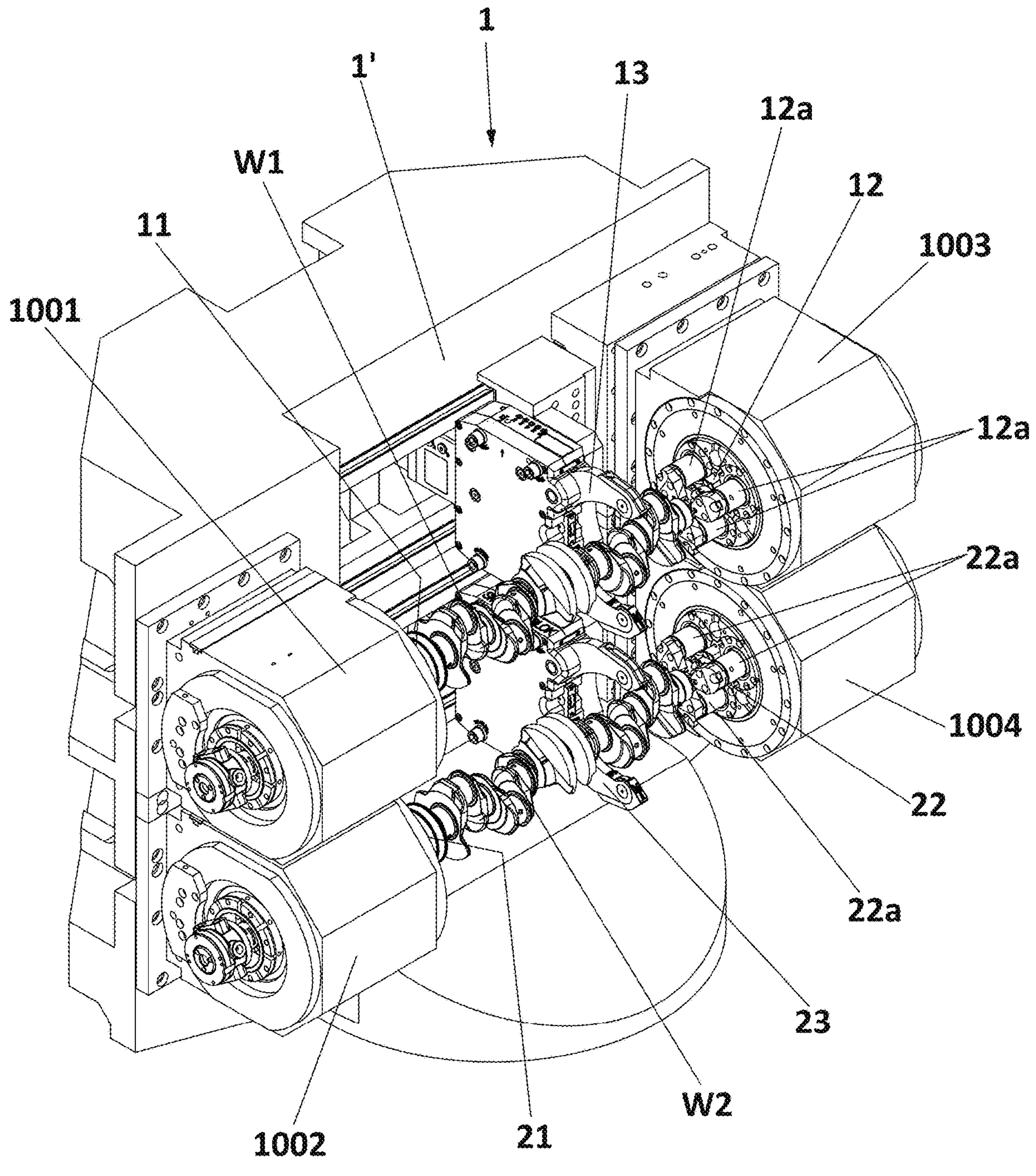
FIG. 3 is a schematic perspective view of the first workpiece support side of the workpiece support column in the embodiment of the disclosure shown in FIG. 1.

FIG. 3 schematically illustrates an alternative embodiment in which the additional support elements 12 or 22 are likewise chucks. The chucks may be provided with retractable jaws, so that during operation, the first workpiece W1 may be selectively rotated by one of the chucks or by the other (that is, by chuck 11 or by chuck 12), while remaining axially fixed at the opposite end by the center of the other chuck (that is, by the center of chuck 12 or by chuck 11), whose jaws may be retracted to allow for machining of that end, and vice-versa. The same applies to the second workpiece W2 and its chucks. Thus, the fact that chucks for clamping and torque transfer, as well as the drive arrangements for applying torque to the chucks, are present at both ends of the workpieces, does not mean that both chucks must be used simultaneously for torque transfer to the respective workpiece. Thus, FIG. 3 schematically illustrates how the workpieces W1, W2 are supported between the chucks 11, 12, 21 and 22 (in the embodiment illustrated in FIG. 3, the workpieces are additionally supported by intermediate, schematically illustrated support means 13 and 23). Only the retractable jaws 12*a* of the third chuck 12 and the retractable jaws 22*a* of the fourth chuck 22 are schematically shown, but in this embodiment also the first chuck 11 and the second chuck 21 feature retractable jaws. The presence of chucks with retractable jaws at both ends of the workpiece makes it possible to machine the workpieces by for example turning or by power-skiving substantially along their entire axial lengths, whereby for machining the workpiece adjacent to one of its axial ends, the jaws of the corresponding chuck may be retracted and the workpiece rotated by torque applied by the chuck clamping the workpiece at the other end, and vice-versa.

As shown in FIG. 3, in this embodiment each chuck forms part of an assembly 1001, 1002, 1003 and 1004 which in addition to the chuck includes drive means. The assemblies 1001 and 1003 constitute first workpiece support means for supporting the first workpiece W1, whereas the assemblies 1002 and 1004 constitute second workpiece support means for supporting the second workpiece W2. The drive means can be of any suitable type, but it is preferred that the assembly be axially short, as schematically illustrated in FIG. 3 where an axially compact arrangement is suggested, featuring an axial length similar to the height and width (or diameter) of the assembly. An example of how this can be achieved will be described below.

Figure 4:
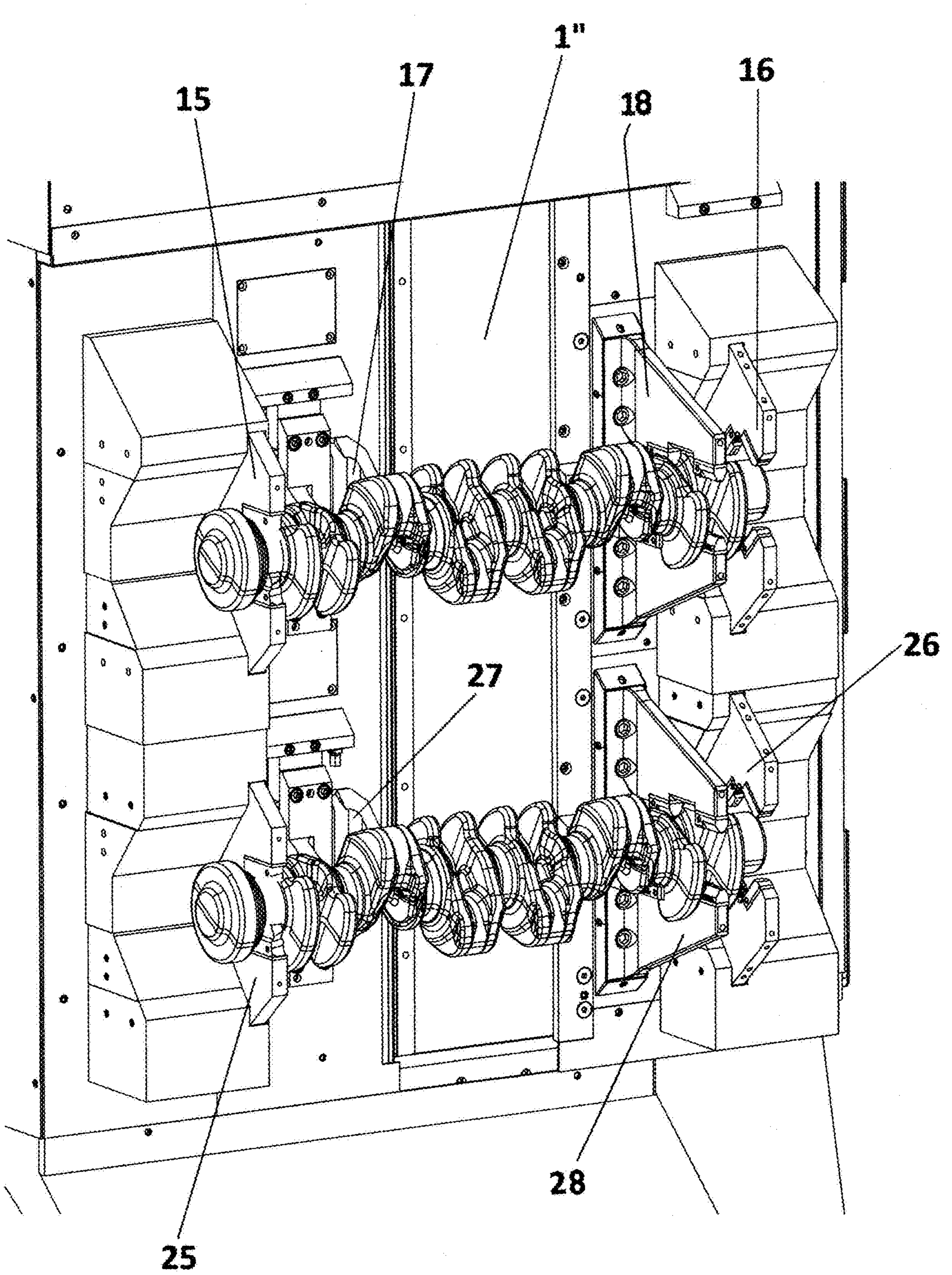
FIG. 4 is a schematic perspective view of a second workpiece support side of the workpiece support column in an embodiment of the disclosure.

As indicated above, the workpiece support column may comprise at least a second workpiece support side 1", which in some embodiments is substantially identical to the first workpiece support side 1'. This is typically the case where the same or similar operations are to be carried out on the workpieces on the two sides. However, in some embodiments, different operations are carried out on the workpieces on the two sides, and each side may thus be optimized for the kind of operations that are to be carried out on the workpieces when supported on the respective side. For example, one side 1' may be optimized for turning, whereas another side 1" may be optimized for machining the ends of the workpieces, for example, for milling the centers thereof. FIG. 4 schematically illustrates the second workpiece support side 1" in accordance with such an alternative embodiment, where the workpiece clamping means 15, 16 for clamping a first workpiece, and the workpiece clamping means 25, 26 for clamping the second workpiece, are configured for clamping the respective workpiece between the ends of the workpiece. For example, in the case of a crankshaft workpiece, the workpiece may be clamped in correspondence with the main journals of the crankshaft. The workpiece support column of the embodiment shown in FIG. 4 additionally includes rest-supports 17, 27 that can serve as temporary supports of the workpieces during loading of the workpieces onto the workpiece support column, and during their unloading sequence. Additionally, means 18, 28 for the angular positioning of the workpieces may be provided, which for example may self-center an eccentric portion of the workpiece.

Figure 5:
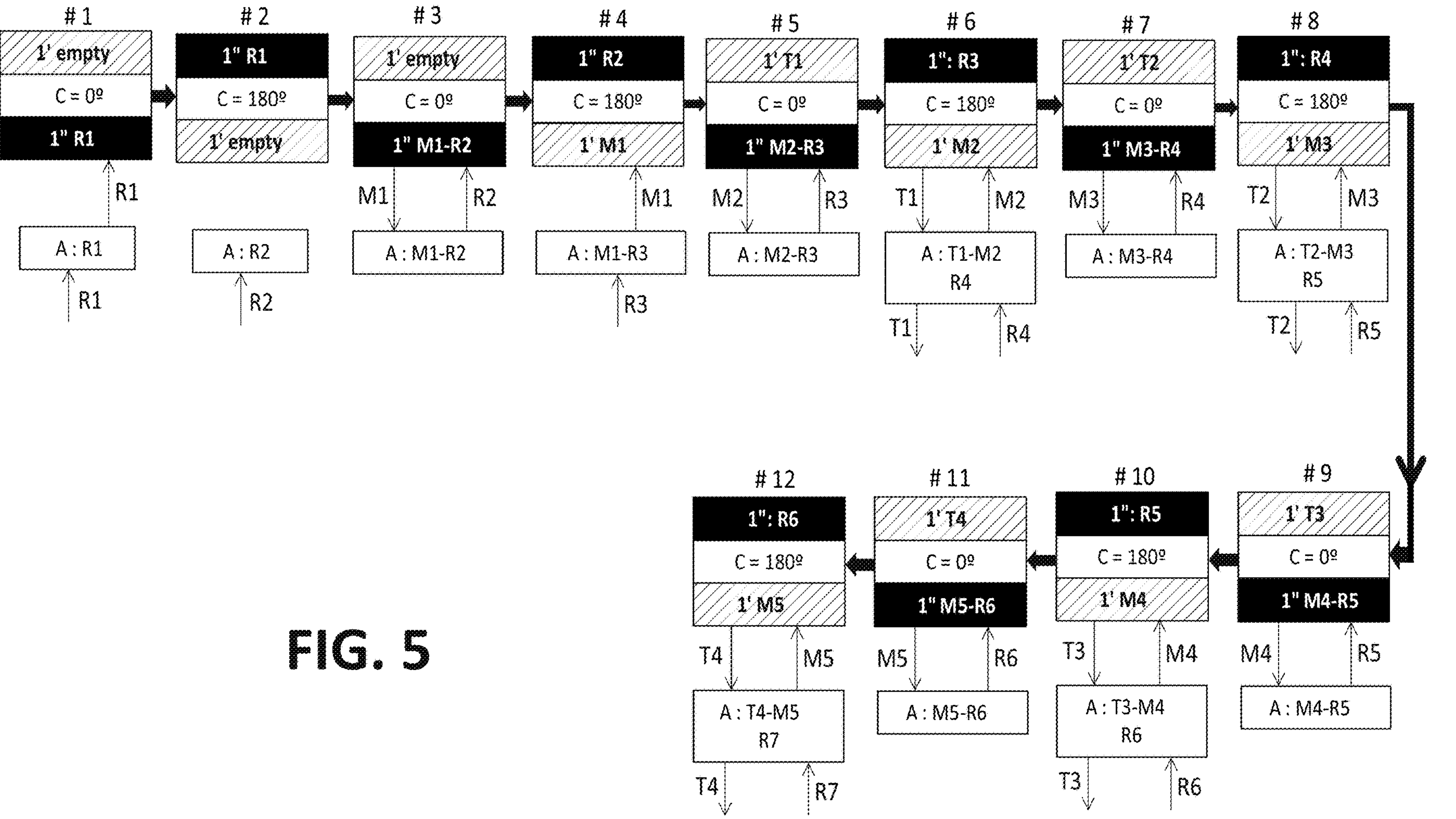
FIG. 5 shows an example of how a machine tool as per the embodiment of FIG. 4 can be used to carry out a sequence of different machining operations on a set of workpieces.

FIG. 5 is a flowchart indicating how a set of workpieces are handled at the station A for loading, and transferred to the first 1' and second 1" sides of the workpiece support column 1 for machining. A first rough workpiece R1 arrives at the station A for loading and unloading and is transferred to the second side 1" of the workpiece support column 1 (in step #1), which is thereafter rotated 180 degrees for machining of the first rough workpiece R1 by milling (step #2), while a second rough workpiece R2 arrives at the station A for loading and unloading. The workpiece support column 1 once again rotates by 180 degrees, bringing the milled workpiece M1 back to the station A for loading and unloading, where the milled workpiece M1 is unloaded and the second rough workpiece R2 is loaded onto the second side 1" of the workpiece support column (step #3). In step #4, after rotating the workpiece support column 180 degrees, the second rough workpiece R2 is subjected to milling (to become a second milled workpiece M2), whereas the first milled workpiece M1 is loaded onto the first side 1' of the workpiece support column, and clamped between the respective chucks. In step #5, the workpiece support column is rotated 180 degrees for unloading the second milled workpiece M2, and for turning the first workpiece to now become a first turned workpiece T1, etc. In the flow diagram, RX thus represents the rough workpiece, MX the milled workpiece, and TX the subsequently turned workpiece. Whereas reference is made to individual workpieces, as explained above, machining of two workpieces, arranged in parallel one above the other, takes place simultaneously.

In other embodiments, machining of the workpieces on two sides of the workpiece support column may take place simultaneously, whereafter the workpieces may be loaded and unloaded at one or two stations for loading and unloading. Thus, for example, two machining stations may be placed diametrically opposite each other with the workpiece support column between them, whereas one or two stations for loading and unloading may be placed angularly between the two machining stations, so that machining operations may be alternated by loading and unloading, for example, by rotation of the workpiece support column by 90 degrees, etc. Multiple different distributions of machining stations and stations for loading and unloading can be implemented within the scope of the present disclosure.

Figure 6A:
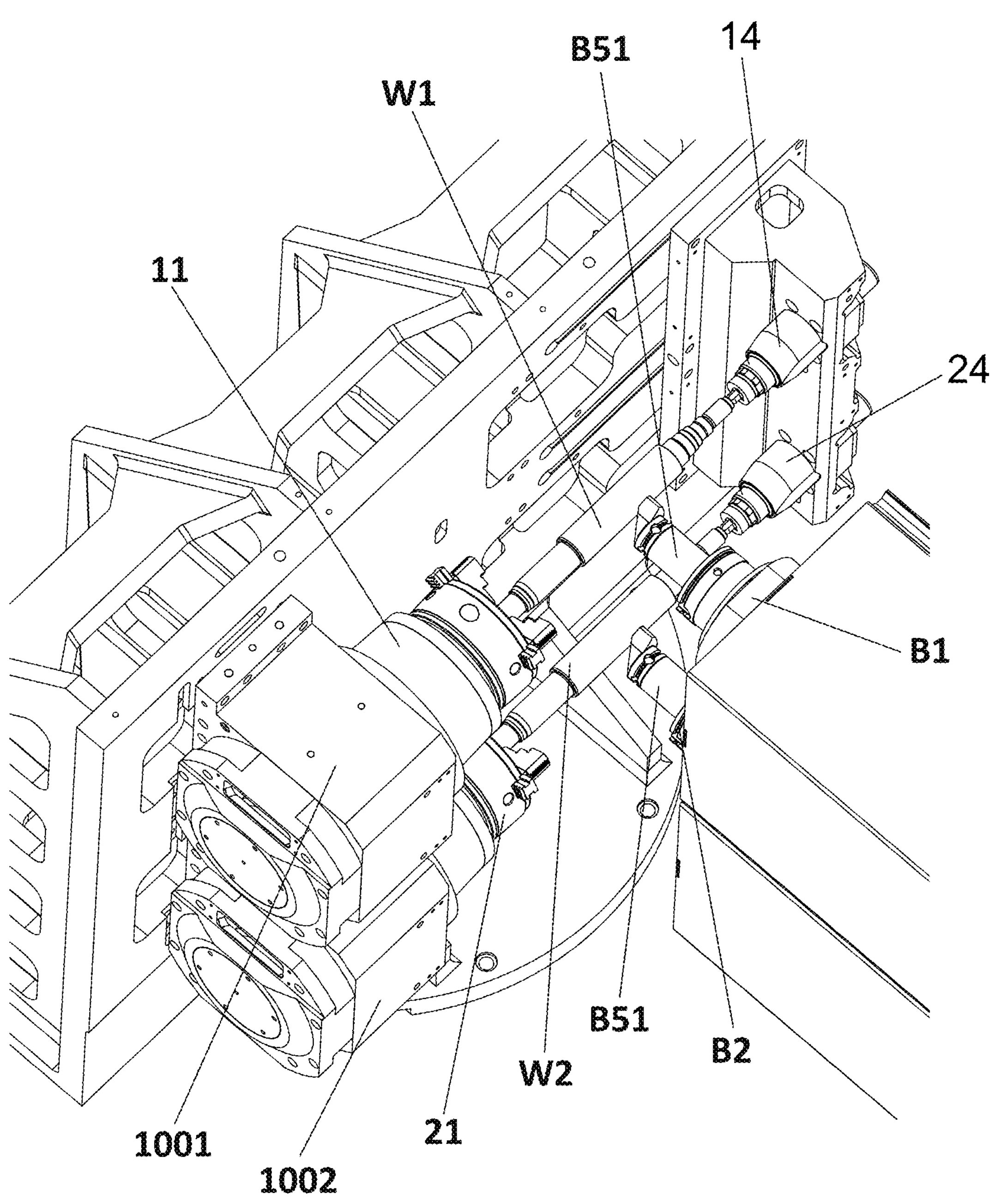
FIGS. 6A-6C schematically illustrate different machining operations that can be carried out with a machine tool according to an embodiment of the present disclosure, while the workpieces remain clamped in position on the workpiece support column.
Figure 6B:
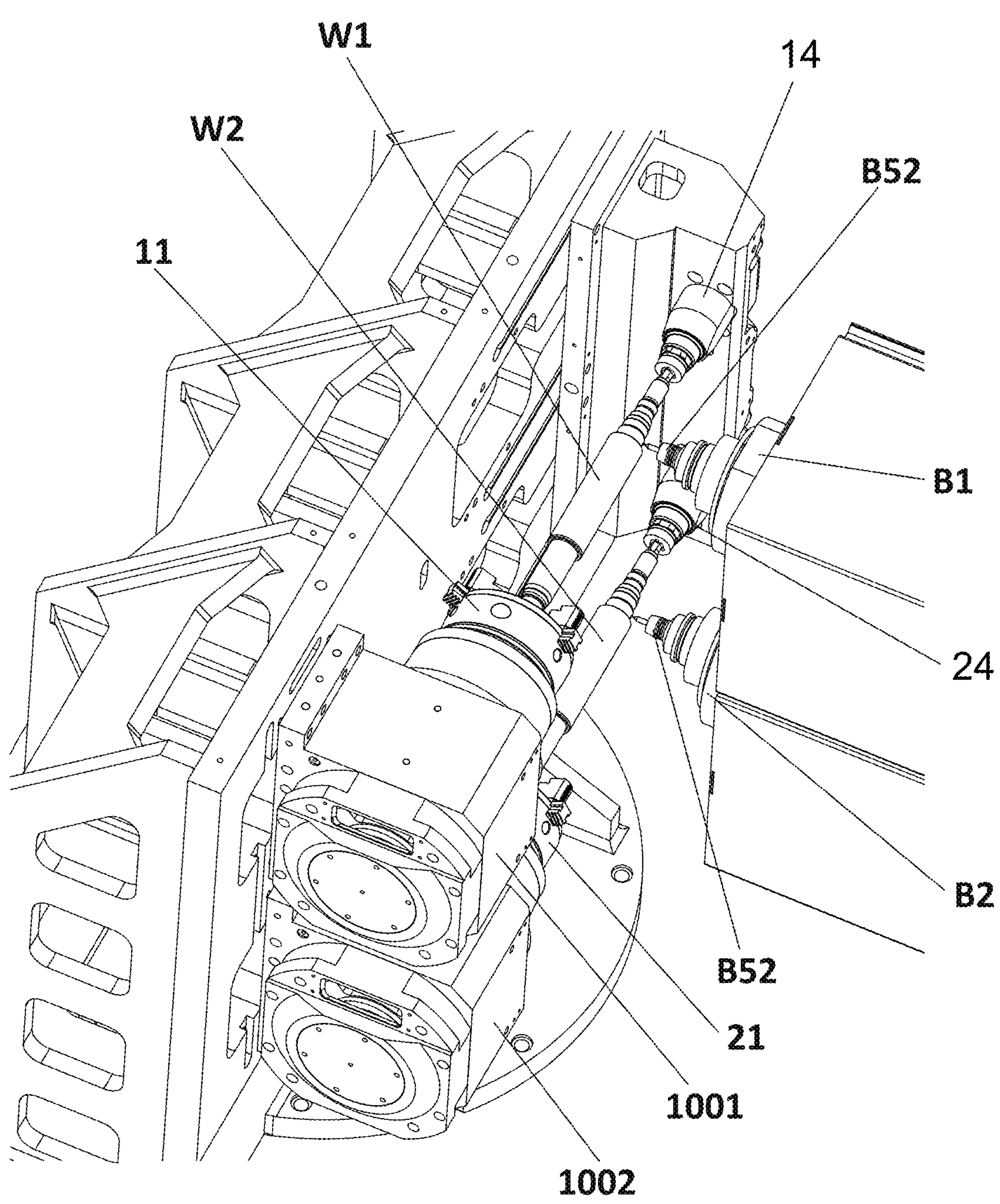
Figure 6C:
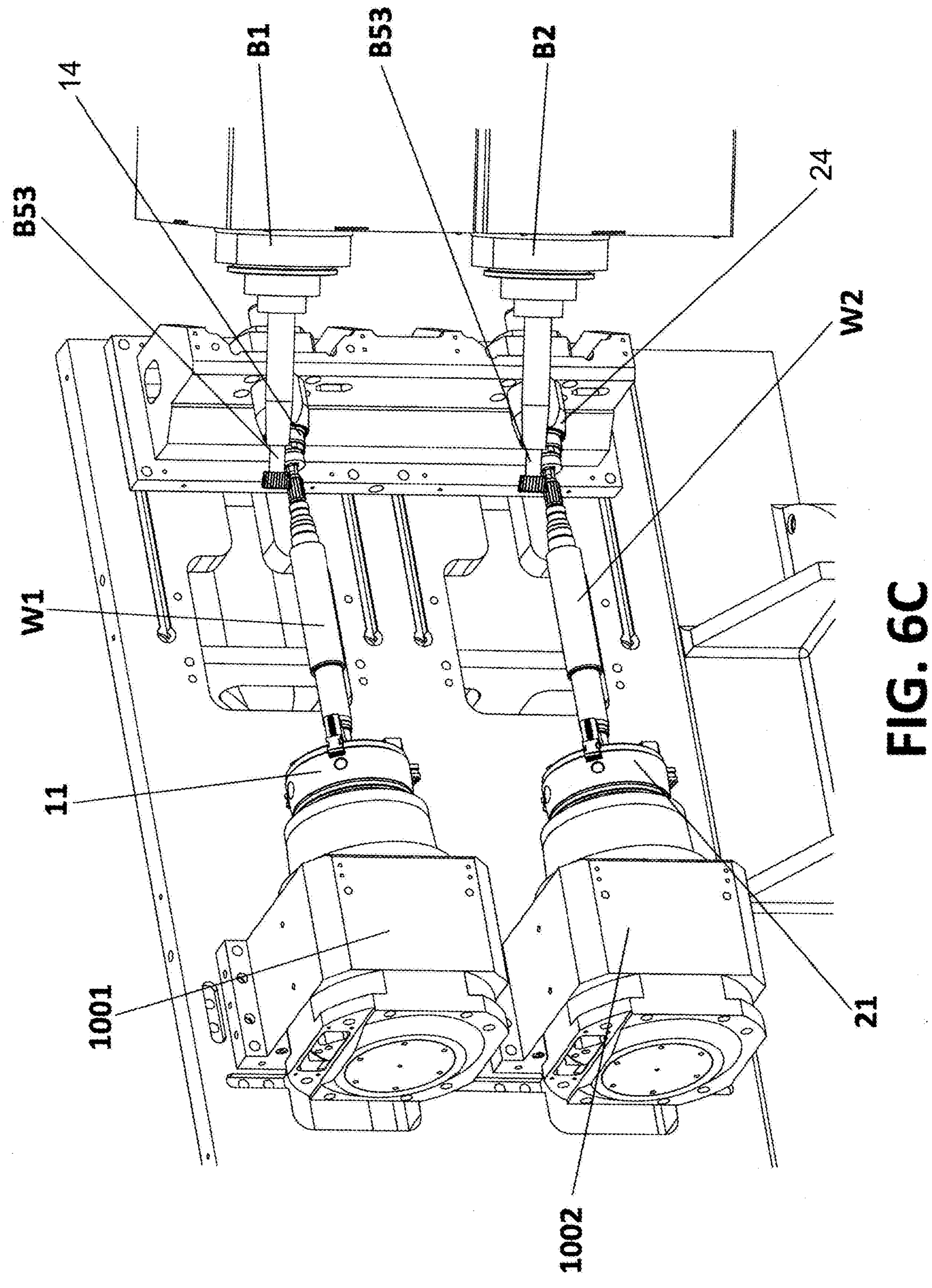

FIGS. 6A-6C schematically illustrate the simultaneous machining of two workpieces W1 and W2 on the first workpiece support side of the workpiece support column of a machine tool according to an embodiment of the disclosure (in this embodiment, each workpiece is clamped by a chuck 11, 21 at one end, and supported by a dead or live center 14, 24 at the other end, that is, in the illustrated embodiment, the machine does not feature two chucks and workpiece spindles/drive means per workpiece). FIG. 6A schematically illustrates rough turning of two rotor shaft workpieces W1, W2, which are rotated by torque applied via chucks 11 and 21, respectively, while contacted by identical rough turning tools B51, B51 supported by the respective tool spindle B1, B2. FIG. 6B schematically illustrates radial drilling of the workpieces. As explained above, the tool spindles B1 and B2 can be shifted in parallel with the X axis to face a tool magazine B5, where for example the rough turning tools B51, B51 can be replaced by drilling tools B52, B52, whereafter the tool spindles can be shifted back to the axial position in front of the workpieces, and thereafter displaced according to their Z axes for carrying out the drilling by rotating the tools, whereas the workpieces are kept stationary. In the illustrated embodiment, the angular position of the workpiece support column is the same in FIGS. 6A and 6B, that is, the angle of attack between the tool spindles B1, B2 and the longitudinal axes of rotation of the workpieces is the same in FIG. 6A and in FIG. 6B, namely, 90 degrees.

FIG. 6C schematically illustrates power-skiving for the production of external involute splines in the workpieces by simultaneous and synchronized rotation of the workpieces W1 and W2 and the power-skiving tools B53, B53. However, here, the angular position of the workpiece support column has been modified (for example, by between 15 and 45 degrees), so that the angle of attack between the tool spindles (and their axes of rotation) and the rotational axes of the workpieces is no longer 90 degrees. Thus, as readily understood, the capacity of rotation of the workpiece support column 1 not only allows for the transfer of the workpieces between different stations (for machining, loading and unloading), but also allows for setting the desired angle of attack between the axes of rotation of the workpieces and the tool spindles, without any need for complex pivotation of the tool spindles around vertical axes.

As readily understood, the different machining operations shown in FIGS. 6A-6C can be carried out while the workpieces remain clamped on the workpiece support column, thereby ensuring that their axial and radial positions remain the same throughout the process. This is useful in order to minimize manufacturing tolerances.

In different embodiments, the first and second workpiece support means may each include one or two motor and chuck assemblies. For example, in the embodiment of FIG. 3, each of the first and second workpiece support means comprises two motor and chuck assemblies, that is, assemblies 1001 and 1003, and assemblies 1002 and 1004, respectively. In the embodiment of FIG. 6A-6C, each workpiece support means comprises only one motor and chuck assembly, and one dead or live center 14, 24. That is, in the present application, reference numbers 12, 22, 14, and 24 refer to the additional support elements of the disclosure, which may include torque driven chucks 12, 22 or, for example, a dead or live center 14, 24.

Figure 7:
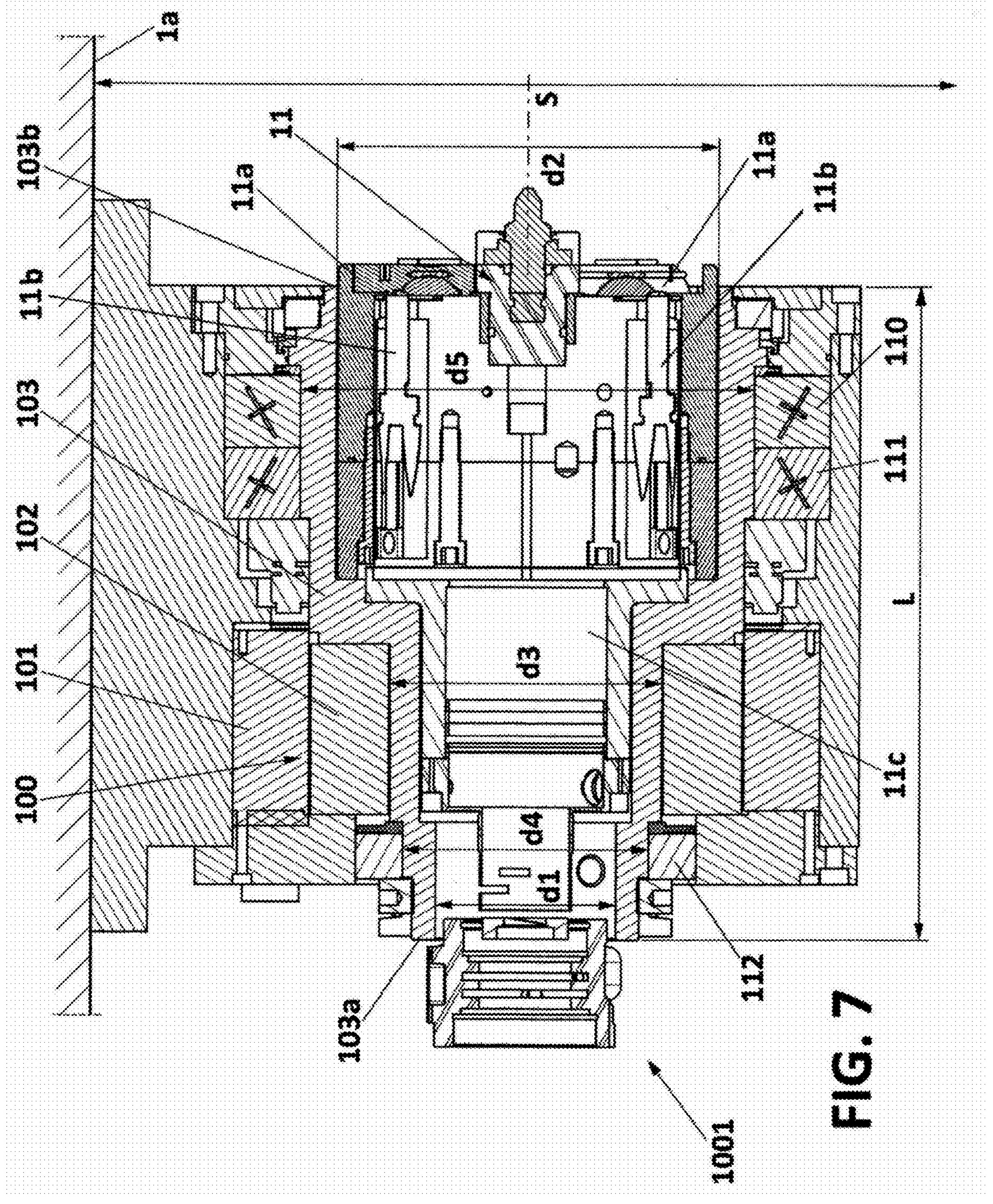
FIG. 7 is a schematic cross-sectional view of part of the first workpiece support means, including motor and chuck, according to an embodiment of the disclosure.

FIG. 7 illustrates an embodiment of a motor and chuck assembly 1001 which can form part of the first workpiece support means in accordance with an embodiment of the disclosure. In some embodiments, the first workpiece support means further comprises another such motor and chuck assembly for the opposite end of the workpiece. The same is true for the second workpiece support means that support the second workpiece.

The motor and chuck assembly 1001 comprises a torque motor 100 with a stator 101 and a rotor 102 arranged within the stator 101. Fitted to the rotor 102 so that it rotates with the rotor is a shaft, namely, a workpiece-spindle 103 that passes through the interior of the rotor, so that a first end 103*a* of the workpiece-spindle 103 is positioned on one side of the rotor 102 (in the axial direction), whereas a second end 103*b* of the workpiece-spindle 103 is situated on the other side of the rotor 102. At its first end 103*a* the workpiece-spindle has a first inner diameter d1 and at its second end 103*b* the workpiece-spindle has a second inner diameter d2. The rotor 102 has a third inner diameter d3, substantially equal to the outer diameter of the workpiece-spindle where it passes through the rotor. In the illustrated embodiment, the second inner diameter d2 is substantially larger than the first inner diameter d1 and also substantially larger than the third inner diameter d3. The relatively large second inner diameter d2 of the workpiece-spindle in correspondence with its second end 103*b* makes it possible to house a substantial part of the retractable jaw chuck 11, including the mechanism 11*b* for actuation (clamping and retraction) of the jaws 11*a*, within the workpiece-spindle, which contributes to a reduction of the axial length of the assembly while at the same time limiting the radial extension, as a relatively small motor can be used: the rotor surrounds the workpiece-spindle at a position where its outer diameter is relatively small, in particular, smaller than the second inner diameter d2 of the workpiece-spindle 103. In the illustrated embodiment, a hydraulic cylinder 11*c* for actuating the mechanism 11*b* for actuation of the jaws is positioned within the workpiece-spindle 103 (in the illustrated embodiment, at an axial position overlapping with the one of the rotor 102). The illustrated embodiment has been found useful for the construction of a motor and chuck assembly suitable for turning that allows for a substantial use of standard components, such as components that are commercially available, including a slightly modified standard cylinder 11*c* for jaw actuation, a standard retractable jaw chuck 11, and a standard torque motor 100, while keeping the assembly relatively short in the axial direction.

The workpiece-spindle 103 is rotationally supported by a first bearing 112 adjacent the first end 103*a*, and by a pair of bearings including a second bearing 110 and a third bearing 111 adjacent the second end 103*b*. The first bearing 112 has an inner diameter d4, and the second bearing 110 and the third bearing 111 both have an inner diameter d5, substantially larger than d4 (such as between 50% and 120% larger). It has been found that this kind of arrangement, combining one or more robust and diametrically large bearings adjacent the axial end of the workpiece-spindle that faces the end of the workpiece, in combination with one or more smaller diameter bearings axially further away from the workpiece (such as adjacent the first end of the workpiece-spindle, the end that is more remote from the workpiece) can provide for sufficient axial and radial stiffness, in combination with relatively limited axial and radial dimensions of the device. The relatively limited inner diameter d4 of the first bearing 112 facilitates its incorporation in an assembly with limited dimensions in the radial direction. In the illustrated embodiment, and compared to typical lathe drive layouts, the inner diameter d5 of the bearing or bearings at the end of the assembly adjacent to the workpiece is relatively large compared to the axial extension L of the workpiece-spindle. For example, L<2*d5. This facilitates the incorporation of the assembly in a rotary workpiece support column of a machine as described above, that is, with the workpiece-spindles oriented horizontally on a workpiece support column arranged to rotate around a vertical axis C.

In FIG. 7 the assembly 1001 is mounted on a wall 1*a* of the workpiece support column, which determines the maximum diameter of the workpiece that can be turned using the machine tool: as schematically illustrated in FIG. 7, the workpiece can have a maximum diameter S (also referred to as the "swing" in the art of lathe machines; in some countries, the swing refers to the maximum radius). It is preferred that the inner diameter d5 of the second bearing 110 be large in relation to the swing S (that is, in relation to the largest diameter of the workpiece that can be machined with the machine). For example, d5>0.5S, for example, d5>0.75S, or d5>0.95.

In this text, the term "comprises" and its derivations (such as "comprising", etc.) should not be understood in an excluding sense, that is, these terms should not be interpreted as excluding the possibility that what is described and defined may include further elements, steps, etc.

The disclosure is obviously not limited to the specific embodiment(s) described herein, but also encompasses any variations that may be considered by any person skilled in the art (for example, as regards the choice of materials, dimensions, components, configuration, etc.), within the general scope of the disclosure as defined in the claims.

The invention claimed is:

1. A machine tool for the machining of elongate workpieces, the machine tool comprising:

a workpiece support column having a first workpiece support side, wherein the first workpiece support side comprises first workpiece support means for supporting a first workpiece and comprises second workpiece support means for supporting a second workpiece, the first workpiece support means and the second workpiece support means being arranged for supporting the first workpiece vertically above the second workpiece; and a machining station comprising at least a first tool spindle for machining the first workpiece, and a second tool spindle for machining the second workpiece;

wherein the workpiece support column is rotatable around a vertical axis so as to shift the workpieces between the machining station and a station for loading and unloading of workpieces;

wherein the first workpiece support means comprise at least a first chuck for clamping a first end of the first workpiece, and a first additional support element for supporting a second end of the first workpiece, the first chuck and the first additional support element facing each other along a first horizontal axis so as to allow for rotation of the first workpiece around the first horizontal axis, wherein the second workpiece support means comprise at least a second chuck for clamping a first end of the second workpiece and a second additional support element for supporting a second end of the second workpiece, the second chuck and the second additional support element facing each other along a second horizontal axis so as to allow for rotation of the second workpiece around the second horizontal axis, wherein the first workpiece support means comprise drive means for applying torque to the first workpiece via the first chuck to rotate the first workpiece around the first horizontal axis for machining of the first workpiece by turning, and wherein the second workpiece support means comprise drive means for applying torque to the second workpiece via the second chuck to rotate the second workpiece around the second horizontal axis for machining of the second workpiece by turning.

2. The machine tool according to claim 1, wherein the first additional support element is a third chuck for clamping the second end of the first workpiece, wherein the second additional support element is a fourth chuck for clamping the second end of the second workpiece, wherein the first workpiece support means comprise drive means for applying torque to the first workpiece via the third chuck to rotate the first workpiece around the first horizontal axis for machining of the first workpiece by turning, and wherein the second workpiece support means comprise drive means for applying torque to the second workpiece via the fourth chuck to rotate the second workpiece around the second horizontal axis for machining of the second workpiece by turning.

3. The machine tool according to claim 2, wherein the machine tool is arranged for selectively retracting workpiece clamping jaws of one of the first chuck and the third chuck, and of one of the second chuck and the fourth chuck, while applying torque to the respective workpiece via the other one of the first chuck and the third chuck, and via the other one of the second chuck and the fourth chuck, so as to allow for machining of the workpieces along their entire lengths, while the workpieces remain axially and radially fixed by the first and second workpiece support means.

4. The machine tool according to claim 2, wherein each of the first and third chucks comprises jaws arranged to apply pressure onto a surface of the first workpiece in a radial direction to allow torque to be applied to the first workpiece via the respective chuck, and whereas the machine tool is arranged to selectively withdraw the jaws of the first chuck from the first workpiece to allow for machining of part of the first workpiece while rotating the first workpiece by applying torque to the first workpiece via the third chuck, and withdraw the jaws of the third chuck from the first workpiece to allow for machining of part of the first workpiece while rotating the first workpiece by applying torque to the first workpiece via the first chuck.

5. The machine tool according to claim 1, wherein the workpiece support column has a second workpiece support side angularly spaced from the first workpiece support side, the second workpiece support side comprising third workpiece support means for supporting a third workpiece and fourth workpiece support means for supporting a fourth workpiece, the third workpiece support means and the fourth workpiece support means being arranged for supporting the third workpiece vertically above the fourth workpiece.

6. The machine tool according to claim 5, wherein the third workpiece support means and the fourth workpiece support means are different from the first workpiece support means and the second workpiece support means, in order to allow machining operations to be carried out on respective workpieces supported on the second workpiece support side that cannot be carried out on respective workpieces supported on the first workpiece support side, due to the manner in which the respective workpieces are supported on the first workpiece support side.

7. The machine tool according to claim 1, wherein the workpiece support column, including the first workpiece support means and the second workpiece support means, is dimensioned to fit into a cylinder that is co-axial with the vertical axis and that has a diameter of less than 2.5 m, while allowing for machining workpieces having a length of 0.75 m by turning said workpieces.

8. The machine tool according to claim 1, wherein the drive means are configured for rotation of the respective workpiece by more than 100 rpm.

9. The machine tool according to claim 8, wherein the drive means are configured for rotation of the respective workpiece by more than 200 rpm.

10. The machine tool according to claim 1, wherein at least one of the workpiece support means comprises an electric motor comprising a stator and a rotor placed radially inside the stator, a hollow workpiece-spindle extending through the rotor, the workpiece-spindle having a first end and a second end, a retractable jaw chuck being the first chuck or the second chuck, the retractable jaw chuck being at least partly arranged within the workpiece-spindle at the second end of the workpiece spindle, the retractable jaw chuck comprising jaws for clamping the respective work-piece, wherein the workpiece-spindle is surrounded by the rotor at a position between the first end of the workpiece spindle and the second end of the workpiece spindle, wherein the workpiece-spindle is rotationally fixed to the rotor so that it rotates with the rotor, wherein the workpiece-spindle has a first inner diameter at the first end of the workpiece spindle and a second inner diameter at the second end of the workpiece spindle, wherein the rotor has a third inner diameter, wherein the second inner diameter is substantially larger than the first inner diameter and/or than the third inner diameter.

11. The machine tool according to claim 1, wherein at least one of the workpiece support means comprises an electric motor comprising a stator and a rotor placed radially inside the stator, a hollow workpiece-spindle extending through the rotor, the workpiece-spindle having a first end and a second end, a retractable jaw chuck being the first chuck or the second chuck, the retractable jaw chuck being at least partly arranged within the workpiece-spindle at the second end of the workpiece spindle, the retractable jaw chuck comprising jaws for clamping the respective work-piece, wherein the workpiece-spindle is surrounded by the rotor at a position between the first end of the workpiece spindle and the second end of the workpiece spindle, wherein the workpiece-spindle is rotationally fixed to the rotor so that it rotates with the rotor, wherein the workpiece-spindle has a first inner diameter at the first end of the workpiece spindle and a second inner diameter at the second end of the workpiece spindle, wherein the rotor has a third inner diameter, wherein the second inner diameter is substantially larger than the first inner diameter and/or than the third inner diameter, wherein the workpiece-spindle is rotationally supported by a first bearing placed at the first end of the workpiece-spindle or between the rotor and the first end of the workpiece spindle, and a second bearing placed at the second end of the workpiece-spindle or between the rotor and the second end of the workpiece spindle, the first bearing having a fourth inner diameter and the second bearing having a fifth inner diameter, wherein the work-piece-spindle has an axial length between the first end of the workpiece spindle and the second end of the workpiece spindle, wherein the axial length is less than three times the fifth inner diameter, the machine tool being arranged for turning of workpieces having a maximum diameter S, wherein the fifth inner diameter is larger than 0.5 S.

* * * * *